(12) United States Patent
Winterot

(10) Patent No.: US 7,411,730 B2
(45) Date of Patent: Aug. 12, 2008

(54) OPTICAL SYSTEM, IN PARTICULAR MICROSCOPE

(75) Inventor: Johannes Winterot, Jena (DE)

(73) Assignee: Carl Zeiss MicroImaging, Jena (DE)

( * ) Notice: Subject to any disclaimer, the term of this patent is extended or adjusted under 35 U.S.C. 154(b) by 219 days.

(21) Appl. No.: 11/258,741

(22) Filed: Oct. 26, 2005

(65) Prior Publication Data
US 2006/0087728 A1   Apr. 27, 2006

(30) Foreign Application Priority Data
Oct. 27, 2004   (DE) ...................... 10 2004 052 276

(51) Int. Cl.
*G02B 21/06* (2006.01)
(52) U.S. Cl. ..................... 359/385; 359/368
(58) Field of Classification Search ................. 359/368, 359/385
See application file for complete search history.

(56) References Cited

U.S. PATENT DOCUMENTS

| 4,422,758 | A | * | 12/1983 | Godfrey et al. .......... 356/152.1 |
| 4,704,010 | A | | 11/1987 | Stana et al. |
| 4,959,824 | A | * | 9/1990 | Ueda et al. ................ 369/44.14 |
| 5,303,001 | A | * | 4/1994 | Jeong et al. .................... 355/53 |
| 6,075,651 | A | | 6/2000 | Hoppe |
| 6,515,750 | B1 | * | 2/2003 | Malyak et al. ............... 356/512 |
| 2003/0165024 | A1 | | 9/2003 | Lindblom |
| 2004/0051941 | A1 | | 3/2004 | Winterot et al. |

FOREIGN PATENT DOCUMENTS

DE   102 17 544 A1   11/2003

* cited by examiner

*Primary Examiner*—Joshua L Pritchett
(74) *Attorney, Agent, or Firm*—Patterson, Thuente, Skaar & Christensen, P.A.

(57) ABSTRACT

A microscope including an optical unit and a collimator. The collimator is arranged preceding or following the optical unit in a beam path of the optical system. The optical unit imposes a predetermined longitudinal chromatic aberration on a beam supplied to a beam path and the beam impinges on the collimator as a diverging beam or a parallel beam and is converted by the collimator into a parallel beam or a converging beam. The collimator includes at least one lens as well as a curved mirror which folds the beam path such that the supplied beam passes twice through the lens.

20 Claims, 5 Drawing Sheets

OPTICAL SYSTEM, IN PARTICULAR MICROSCOPE

BACKGROUND OF THE INVENTION

Such optical system is, for example, a fluorescence correlation spectroscope or a laser-scanning microscope. In a laser-scanning microscope, there is often the problem that, due to the longitudinal chromatic aberration characteristic of the optical unit (the objective), excitation undesirably occurs at different depths in a sample.

It is known from DE 102 17 544 A1 to construct a collimator using at least two lenses of different optical materials, which collimator serves to reduce the longitudinal chromatic aberration of the objective. However, since the collimator is constructed using at least two lenses of different optical materials, its production is complex and costly.

In view thereof, it is an object of the invention to provide an optical system comprising an optical unit and a collimator, said system allowing the above-described disadvantages to be overcome.

SUMMARY OF THE INVENTION

According to the invention, the object is achieved by an optical system, in particular a microscope, comprising an optical unit and a collimator, which collimator is arranged preceding or following the optical unit in a beam path of the optical system, said optical unit imposing a longitudinal chromatic aberration on a beam supplied to said beam path and said beam impinging on the collimator as a diverging beam or a parallel beam and being converted by said collimator into a parallel beam or a converging beam, with the collimator comprising at least one lens as well as a curved mirror which folds the beam path such that the supplied beam passes twice through the lens. This allows inexpensive manufacture of a collimator.

In particular, the longitudinal chromatic aberration characteristic of the collimator may be designed such that the longitudinal chromatic aberration imposed on the beam by the optical unit remains unchanged or is reduced.

Thus, the optical system according to the invention provides a collimator which either converts a diverging beam into a parallel beam or a parallel beam into a converging beam and, in doing so, either imposes no longitudinal chromatic aberration on the converted beam or imposes thereon a longitudinal chromatic aberration which is opposed to the longitudinal chromatic aberration of the optical unit. This ensures that the collimator does not deteriorate the longitudinal chromatic aberration caused by the optical unit. Preferably, the collimator even reduces the longitudinal chromatic aberration caused by the optical unit.

The collimator of the optical system may be designed such that the longitudinal chromatic aberration caused by the collimator increases monotonically (as the wavelength increases) or decreases monotonically (as the wavelength increases). For example, this is achieved solely by changing the lens shape for a predetermined lens material, with the longitudinal chromatic aberration increasing monotonically, if the lens acts as a diverging lens, and the longitudinal chromatic aberration decreasing monotonically, if the lens acts as a collecting lens.

The optical system according to the invention may be, in particular, a laser-scanning microscope or a fluorescence correlation spectroscope. The collimator may serve to parallel a beam coming from a small (punctiform) light source. In this case, the collimator is arranged on the excitation side of the microscope. As an alternative, it is possible to use the collimator in the detection beam path in order to converge a parallel beam to one point. In this case, the collimator may be used as pinhole optics.

The use of the curved mirror in the collimator allows the number of lenses needed to be reduced. In particular, it is possible to use one single lens and to thus set the desired longitudinal chromatic aberration characteristic of the collimator. Of course, the collimator may also comprise several lenses. In this case, all lenses are preferably manufactured from the same material.

The supplied beam may comprise radiation (preferably light) of a predetermined wavelength having a certain bandwidth. In this case, the collimator is preferably designed for this wavelength region in the manner of the invention. However, the supplied beam may also contain light of two or more different wavelengths or wavelength regions, respectively, which do not overlap, but are spaced apart. In this case, the longitudinal chromatic aberration characteristic of the collimator may be related to the different wavelength regions relative to each other.

In particular, the mirror has a concave curvature. This allows the desired conversion of the diverging beam into the parallel beam or of the parallel beam into a converging beam to be realized with particular ease.

The mirror may be provided as a rear surface mirror on one side of the lens. This has the advantage that the mirror need no longer be adjusted relative to the lens. Moreover, typical coatings for rear surface mirrors may be employed, thus effectively preventing soiling of the mirror.

The collimator of the optical system may have the lens as the only lens and the mirror as the only mirror. Thus, a collimator having the desired longitudinal chromatic aberration characteristic can be realized using an extremely small number of optical elements.

Preferably, both sides of the lens are provided as spherical surfaces. The mirror may also be a spherical mirror. This leads to a clear reduction in the manufacturing cost of the collimator, because spherical surfaces are easy to manufacture with the desired accuracy.

A preferred embodiment of the optical system according to the invention consists in that the supplied beam is incident on the collimator optics such that the main ray of the beam coincides with the optical axis of the collimator. Thus, the incident beam is reflected back in itself. In this case, undesired imaging errors of the collimator optics can be minimized.

Further, a deflecting mirror having a through hole may be arranged preceding or following the collimator, wherein the beam, if it is a diverging beam, passes through the through hole and impinges on the collimator, and the parallel beam coming from the collimator is deflected by the deflecting mirror, and wherein the beam, if it is a parallel beam, is deflected by the deflecting mirror to the collimator and impinges on the collimator, and the converging beam coming from the collimator passes through the through hole. In this embodiment, the perpendicular incidence of the supplied beam on the collimator is particularly easy to realize.

Further, the collimator of the optical system according to the invention may be provided as a first exchangeable collimator, which may be replaced with a second collimator of the optical system, said second collimator having a longitudinal chromatic aberration characteristic for a different wavelength region than the first collimator such that, for the other wavelength region, the longitudinal chromatic aberration imposed by the optical unit remains unchanged or is reduced.

This variant with exchangeable collimators is particularly advantageous if the optical system is consecutively used with beams having different wavelengths.

A further preferred embodiment of the optical system according to the invention consists in that the collimator comprises the mirror as well as two or three lenses, and the lenses as well as the mirror are displaceable along the optical axis of the collimator, so as to allow adjustment of a desired longitudinal chromatic aberration characteristic of the collimator. Thus, even during operation of the optical system, the longitudinal chromatic aberration characteristic of the collimator may be changed and adapted as required. In particular, this adjustment can be effected such that other optical parameters remain unchanged. For example, the collimator may be provided such that it has a constant focal length.

All lenses are preferably made from the same material. This reduces manufacturing costs and leads to an inexpensive, but very flexible collimator.

If the optical system is provided as a laser-scanning microscope, it may also comprise a deflecting or scanning unit, respectively, which is arranged between the collimator and the optical unit.

The optical system may preferably be provided such that the optical unit itself is provided as a further collimator comprising at least a second lens and a second curved mirror, the latter folding the beam path such that the supplied beam passes twice through the second lens.

In particular, both collimators may be coupled via a deflecting mirror with a through hole such that the supplied beam is directed to the first or the further collimator by the deflecting mirror, is then reflected back in itself by said collimator and focused on the through hole, passes through said through hole and impinges on the other one of said two collimators, is reflected back in itself by the latter and directed to the deflecting mirror, by which it is deflected again. This allows to provide a device for decreasing or increasing the beam cross-section, in particular of parallel beams, which device simultaneously also has desired longitudinal chromatic aberration characteristics.

The further collimator may be further embodied in the same manner as the first collimator in the above-described preferred embodiments of the optical system according to the invention.

The optical system may be provided as a laser-scanning microscope or as a fluorescence correlation spectroscope, with the collimator being arranged in the excitation beam path and/or in the detection beam path.

DESCRIPTION OF THE FIGURES

The invention will be explained in more detail below, by way of example, with reference to the drawings, wherein.

DETAILED DESCRIPTION

Figure 1:
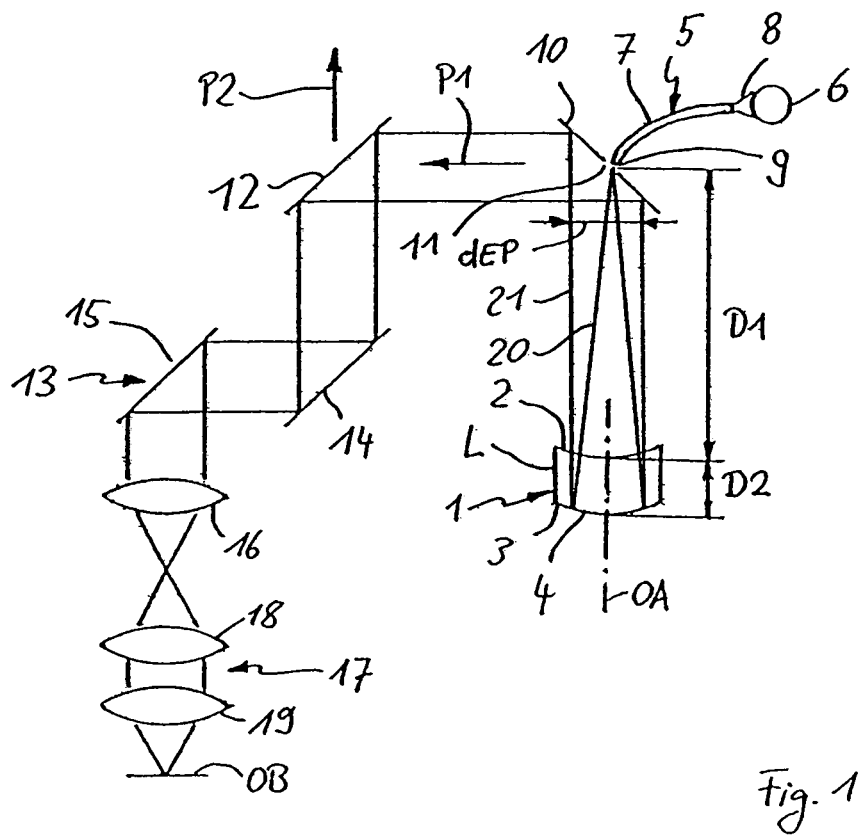
FIG. 1 shows a schematic view of an embodiment of the optical system according to the invention.

In the embodiment shown in FIG. 1, the optical system according to the invention is provided as a laser-scanning microscope, which comprises a collimator 1 including a single lens L having a concave side 2 and a convex side 3, said convex side 3 being silvered so as to form a rear surface mirror 4 thereon.

The laser-scanning microscope further includes a light source 5, which comprises a light-source unit 6 and a single-mode fiber 7, wherein the light from the light-source unit 6 is coupled into the single-mode fiber 7 through one end thereof and coupled out at the other end 9. Thus, the end 9 forms a point light source and is arranged behind a deflecting mirror 10 in a manner allowing said end to emit the light directly into a through hole 11 of the deflecting mirror 10. Of course, at the location where the light exits the fiber, there may be, for example, the focal point of focusing optics (not shown).

The laser-scanning microscope further includes a main color splitter 12, a deflecting unit 13, the two deflecting mirrors 14 and 15 as well as scanning optics 16, and microscope optics 17, which comprise a tube lens 18 and an objective 19. Instead of the two deflecting mirrors 14 and 15, the deflecting unit 13 may, of course, include only one single deflecting mirror (not shown), which is pivotable about two axes, for example.

During operation, a diverging illumination beam 20 exits from the end 9 of the fiber 7, with the main ray of the diverging illumination beam 20 coinciding with the optical axis OA of the collimator (or of the collimation optics, respectively) 1 and impinging on the collimation optics 1, which transform the illumination beam 20 into a parallel beam 21, which impinges on the deflecting mirror 10 and is reflected by the latter to the main color splitter 12, as indicated by the arrow P1. In a known manner, the parallel beam 21 is then focused and moved, by means of the main color splitter 12, the deflecting unit 13 and the microscope optics 17, onto the object OB to be examined, in order to excite fluorescence, for example. The fluorescent light passes through the microscope optics 17, the deflecting unit 13 and is then directed into a detection beam path by the main color splitter 12, as indicated by the arrow P2. In the detection beam path, the fluorescent light is analyzed in a known manner.

The collimation optics 1 are designed such that their chromatic longitudinal aberration for the light of the light source 5 reduces the chromatic longitudinal aberration of the microscope optics 17. The light of the light source 5 may be, for example, light having a wavelength of 565 nm±15 nm. In this case, the collimation optics 1 for this wavelength region are designed such that the chromatic longitudinal aberration of the microscope optics 17 in this wavelength region is reduced.

Figure 2:
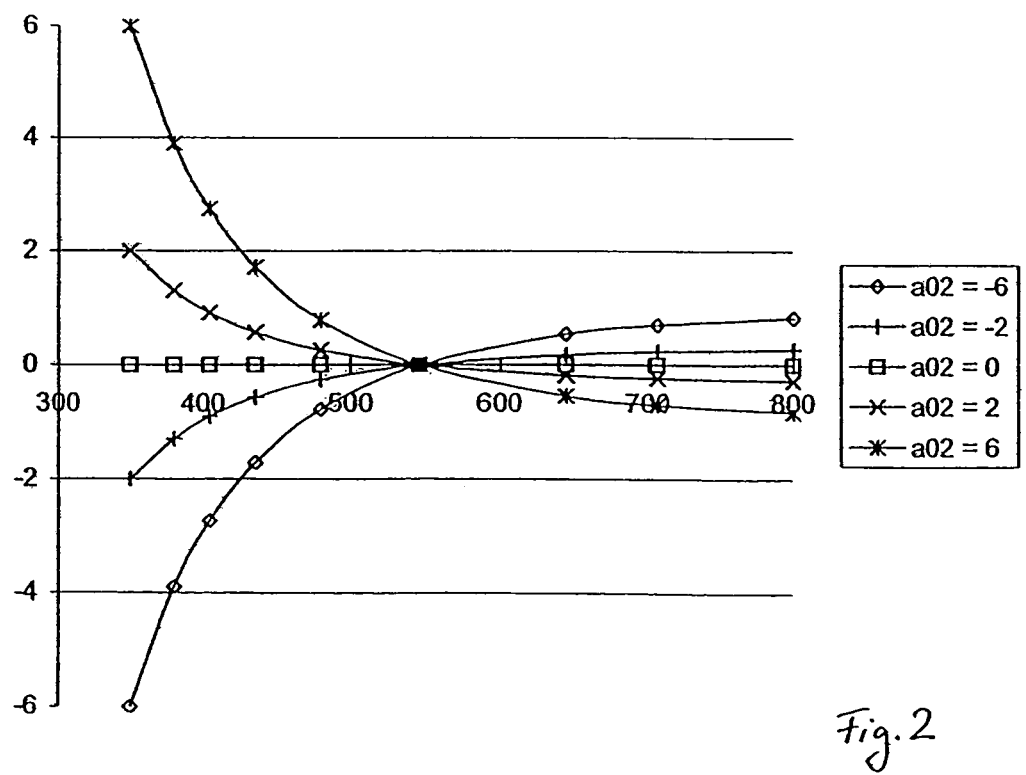
FIG. 2 shows a diagram illustrating the chromatic longitudinal aberration of the collimator of the optical system of FIG. 1.

FIG. 2 shows the longitudinal chromatic aberration characteristic of five variants of the collimation optics 1 according to the invention. Along the abscissa, the wavelength $\lambda$ is represented in nm, and along the ordinate, the longitudinal chromatic aberration $a02(\lambda)$ is shown as a wave surface deformation in parts of $\lambda$, wherein $s(\lambda)=1.1*\lambda*a02(\lambda)/nA^2$ allows to calculate the physical focal intercept. $\Delta s = s(\lambda) - s(546\ nm)$ describes a focal intercept difference for the wavelength λ, and nA is the numerical aperture, which is defined here as $$\frac{1}{2} \cdot \frac{dEP}{f}$$

(dEP being the diameter of the entrance pupil, which is dEP=3.2 mm here, and f being the focal length of the collimator). The value of a02(λ) for λ=350 nm is, in this case, simply referred to as a02 and serves as a parameter for distinguishing different longitudinal chromatic aberration characteristic of the collimator.

The line a02=−2 shows the longitudinal chromatic aberration characteristic of the collimator 1 of FIG. 1, which is provided as a rear surface-silvered single lens having the following parameters:

Radius of curvature of the concave front surface 2: 54.13 mm
  Radius of curvature of the convex rear surface 3: 42.34 mm
  Thickness D2 of the lens: 3.71 mm
  Distance D1 of the front surface 2 from the point light source: 17.14 mm
  Material parameter: $n_e$=1.58481, $v_e$=40.57
  Focal length f: 20 mm The longitudinal chromatic aberration characteristics of the microscope optics 17 (curve a02=0) alone and in combination with the collimator 1 (curve a02=−2) are shown in FIG. 3, wherein, again, the wavelength λ is shown in nm along the abscissa and the longitudinal chromatic aberration a02(λ) is shown in mm along the ordinate.

Figure 3:
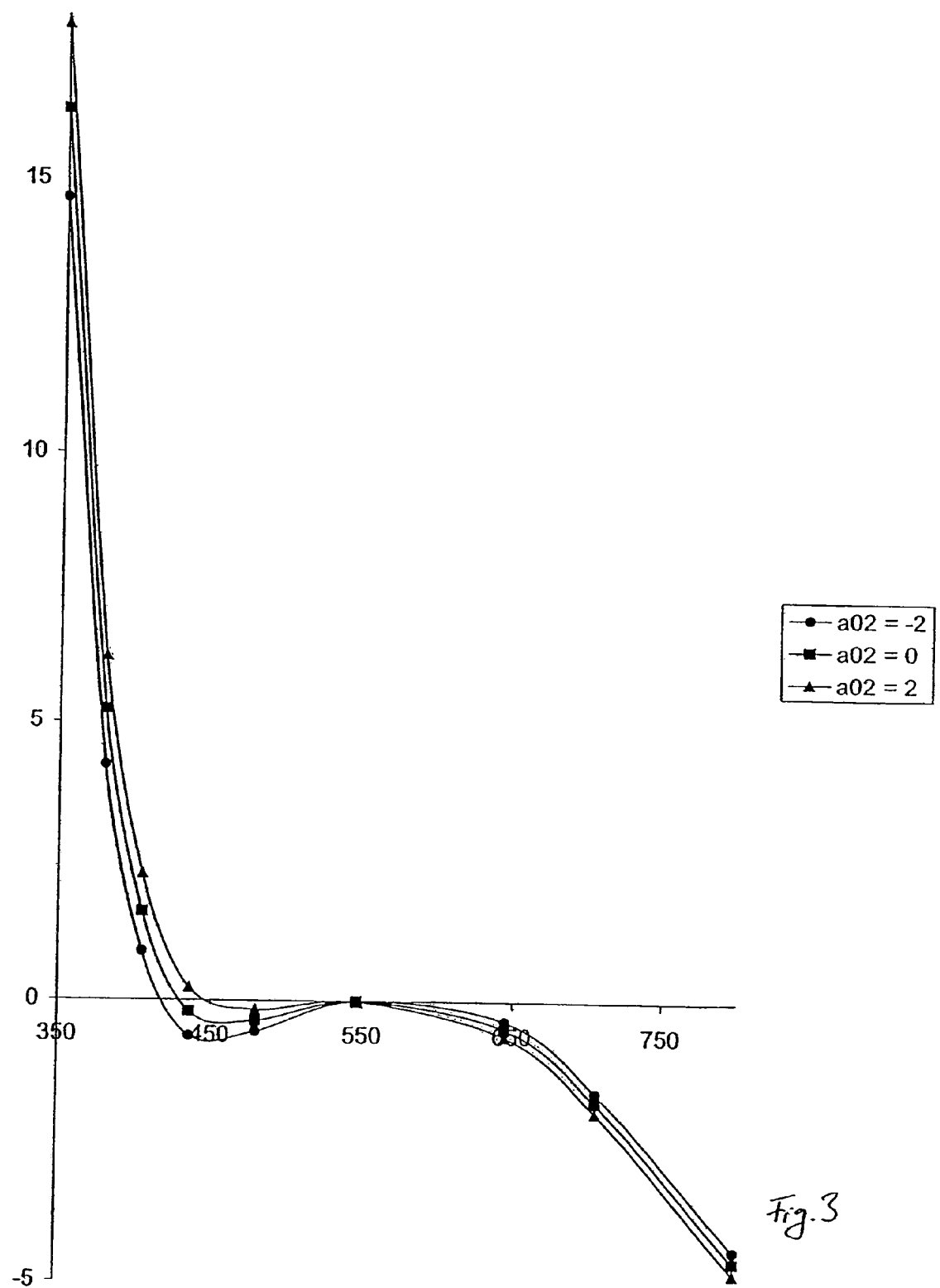
FIG. 3 shows a diagram illustrating the chromatic longitudinal aberration of the entire optical system of FIG. 1.

As is evident from the comparison of curves a02=0 and a02=−2 in FIG. 3, the longitudinal chromatic aberration of the microscope optics 17 decreases monotonically in the region of greater than 550 nm (curve a02=0 in FIG. 3) and can therefore be excellently compensated for (curve a02=−2 in FIG. 3) by the opposed longitudinal chromatic aberration of the collimator 1 (curve a02=−2 in FIG. 2). The longitudinal chromatic aberration in the region of from 550 to 600 nm is practically 0 and, thus, almost completely eliminated. Therefore, the laser-scanning microscope is achromatized in this wavelength region on the excitation side. Further, the longitudinal chromatic aberration in the region of from 600 to 650 nm is, at maximum, only half as great as compared to the longitudinal chromatic aberration characteristic of the microscope optics 17 alone (curve a02=0).

In FIG. 2, the longitudinal chromatic aberration characteristics of modifications of the collimator according to FIG. 1 are shown, but the basic structure as a rear surface-silvered, concave-convex single lens is maintained and also the same lens material is used. Merely the radiuses of curvature as well as the lens thickness and the distance D1 are varied.

The following Table shows the corresponding radiuses of curvature and distances, with the focal length f of the collimator 1 of FIG. 1 as well as that of the modifications according to the following Table being 20 mm each.

| Curve a02 = | Radius of curvature Front surface 2 [mm] | Radius of curvature Rear surface 3 [mm] | D2 [mm] | D1 [mm] |
|---|---|---|---|---|
| −6 | 177.95 | 56.89 | 3.74 | 17.66 |
| 0 | 40.21 | 42.34 | 3.71 | 17.74 |
| +2 | 31.98 | 39.31 | 4.00 | 17.59 |
| +6 | 22.66 | 34.29 | 4.05 | 17.60 |

As is clearly evident from the illustration in FIG. 2, the longitudinal chromatic aberration characteristic can thus be set from monotonically decreasing, as the wavelength increases (a02=6 or 2), via independent from the wavelength (a02=0), to monotonically increasing, as the wavelength increases (a02=−6 or −2), by simply selecting the radiuses of curvature and the distances, or by changing the geometrical dimensions, respectively, without changing the material. This allows the desired optimal correction of the microscope optics 17 to be set for the corresponding case of application (i.e. for the corresponding wavelengths).

FIG. 3 also shows the longitudinal chromatic aberration characteristic of the microscope optics 17 in combination with a collimator 1 as being a02=2. In this case, an excellent reduction of the longitudinal chromatic aberration in the wavelength region of from 450-550 nm is achieved.

The collimator 1 of FIG. 1 as well as the modifications shown in FIG. 2 all satisfy the following condition:

$|1/R2-(a02*(b2/f^2+b1/f+b0)+c2/f^2+c1/f+c0)|<0.0003$

R2 is the radius of curvature of the rear surface 3 and f is the focal length of the collimator 1; and the constants c0, c1, c2, b0, b1, b2 have the following values:

b0 = −0.0010395
b1 = −0.003737
b2 = 0.0844626
c0 = 0.00068469
c1 = −0.570058
c2 = 1.679172

The above condition allows R2 and thus the radius of curvature of the mirror 4 to be defined. The collimator may be designed to have different focal lengths. Focal lengths may be set which satisfy the following inequality: 0.002<1/f<0.1.

The above condition can be derived from the numerical analysis of the designed collimator or optical system, respectively, as a function of predetermined marginal conditions (e.g. focal length of the collimator, lens material, . . . ).

It is further possible, in the optical system according to the invention, to change the distance D1. This may be effected, in particular, by moving the collimation optics 1 along the optical axis OA. In the diagram of FIG. 2, an increase in the distance D1 results in a displacement of the corresponding curve along the ordinate, toward lower values. Accordingly, a decrease in the distance D1 leads to an upward displacement of the curve.

It is also possible, of course, to provide the mirror 4 as a separate mirror. The collimation optics 1 may also comprise a grating, which is provided, for example, on the front surface 2, the rear surface 3 or on the mirror surface 4.

In the optical system according to the invention, if the supplied light contains different wavelength regions (e.g. 500 nm±15 nm and 430 nm±15 nm), the collimator optics 1 may be provided such that their longitudinal chromatic aberration with respect to both wavelength regions compensates or at least reduces the corresponding longitudinal chromatic aberration of the microscope optics.

Figure 4:
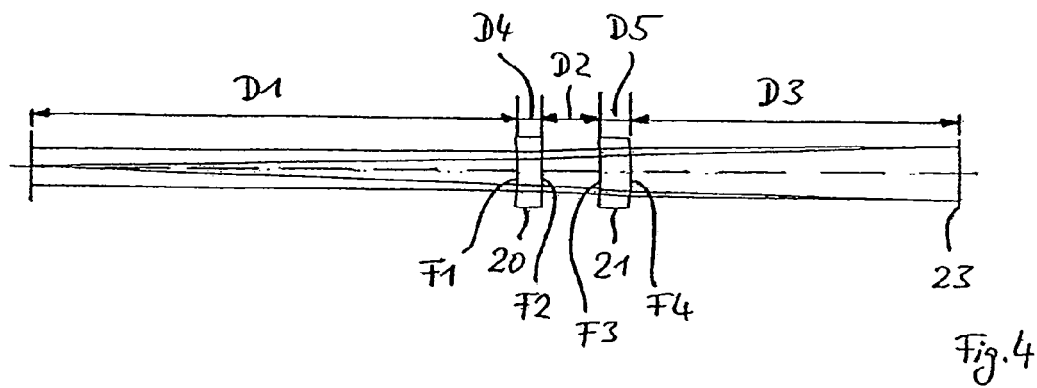
FIG. 4 shows a collimator according to a second embodiment.

FIG. 4 shows a further modification of the collimator 1. In this embodiment, the collimator 1 comprises two concave-convex lenses 20, 21 as well as a concave mirror 23. The lenses 20 and 21 as well as the mirror 23 are movable along the optical axis such that their distances are variable. For example, for a constant focal length f of the collimator 1 in FIG. 4, this allows the longitudinal chromatic aberration of the optical system (i.e. of the microscope optics 17 and the collimator 1) to be tuned continuously from under-compensated (the longitudinal chromatic aberration of the microscope optics 17 is not fully compensated) to over-compensated (the longitudinal chromatic aberration of the collimator 1 is so great that, although the longitudinal chromatic aberration of the microscope optics 17 is compensated, the optical system now has a longitudinal chromatic aberration caused by the collimator 1).

In the embodiment of FIG. 4, the lenses 20 and 21 are made from the same material and have an Abbe dispersion number of 36.16. The distance from the entrance pupil of the collimator 1 to the concave side of the lens 20 is D1; the distance between the two sides of the lenses 20 and 21 facing each other is D2, and the distance from the convex side of the lens 21 to the mirror 23 is D3. The thickness of the lenses 20 and 21 is D4 and D5. The focal length f is 20 mm. In this case, the curvature of the mirror 23, the refractive power of the lenses 20 and 21, and the dynamics of movement (i.e. the variation of the distances D1, D2 and D3) may be described as follows as a function of the focal length of the system, wherein focusing and adjustment of the focal length is caused by selecting two of the three distances D1, D2 and D3, and the longitudinal chromatic aberration characteristic may be defined by selecting the value of the third distance (in this case, D3):

$$|1/R+0.4088/f+0.0023|<0.001$$

$$|f1+0.0669*f+28.788|<0.05*f$$

$$|f2-0.0271*f-57.22|<0.05*f$$

$$|D3(\Delta s(=0))-D3(\Delta s(<0))-0.4179*f+1.4475|<0.02*f$$

$$|D3(\Delta s(>0))-D3(\Delta s(<0))-0.731*f-2.867|<0.02*f$$

R is the radius of curvature of the mirror 23, and f1 as well as f2 are the focal lengths of the lenses 20 and 21, respectively. $\Delta s(<0)$ represents $\Delta s$ having a value of less than 0. $\Delta s(=0)$ represents $\Delta s$ having a value of 0, and $\Delta s(>0)$ represents $\Delta s$ having a value of greater than 0. In the embodiment described herein, $\Delta s(<0)$ reaches a value a02 of about −3.5 and $\Delta s(>0)$ reaches a value a02 of about +3.5.

The exact parameters of the collimator 1 of FIG. 4 are as follows:
Radius of curvature of the concave surface F1: 13.10
Radius of curvature of the convex surface F2: 48.39
Radius of curvature of the concave surface F3: 18.44
Radius of curvature of the convex surface F4: 12.78
Radius of curvature of the concave mirror 23: 43.99
D4=2.00
D5=2.00.

|    | $\Delta s(<0)$ | $\Delta s(=0)$ | $\Delta s(>0)$ |
|----|------|------|-------|
| D1 | 14.05 | 6.93 | 3.12 |
| D2 | 4.83 | 3.12 | 0.55 |
| D3 | 0.50 | 7.68 | 16.57 |

Figure 5:
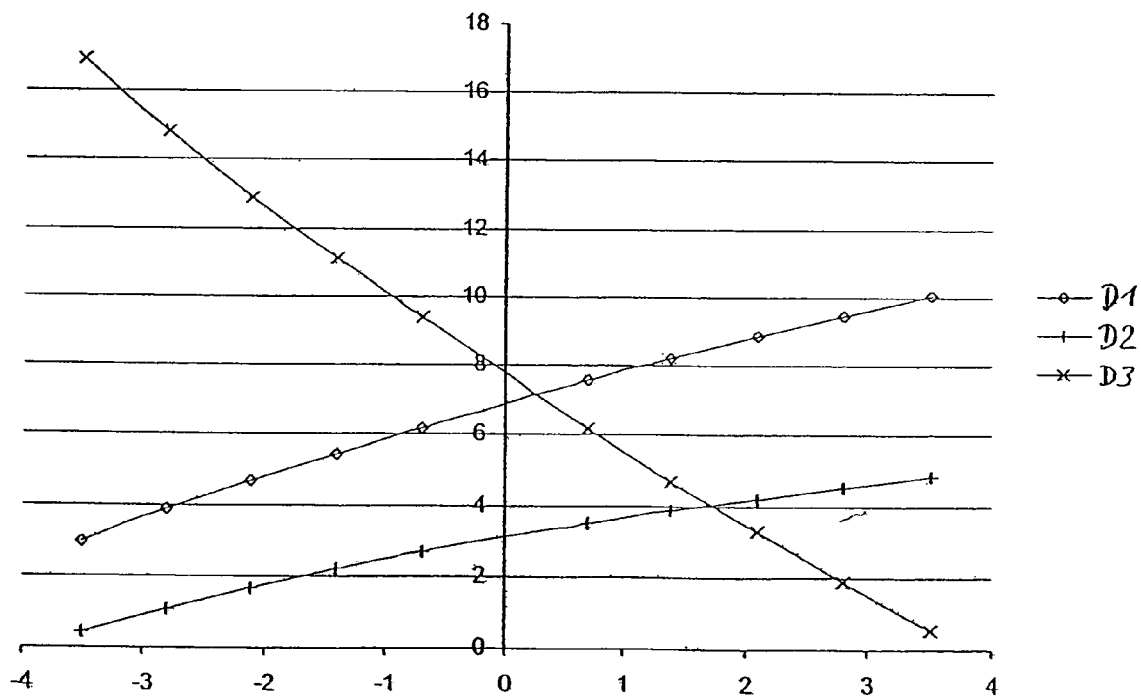
FIG. 5 shows a diagram from which the lens and mirror positions to be adjusted for the desired chromatic longitudinal aberration characteristic are evident.

The above Table indicates special values for $\Delta s$. FIG. 5 graphically illustrates the dependence of the longitudinal chromatic aberration characteristic of the distances D1, D2 and D3 such that the value of a02 is indicated along the abscissa and the value of the corresponding distance is indicated in mm along the ordinate. Each individual value of the parameter a02 in turn has longitudinal chromatic aberration characteristics associated to it, which are not shown here, but qualitatively correspond to those represented in FIG. 2. Thus, the distances D1-D3 to be set may then be taken from the representation of FIG. 5 as a function of the desired longitudinal chromatic aberration characteristic. The corresponding distances for the values of a02 of −3.5, 3.5 and 0 are indicated in the above Table.

The collimator 4 may be designed for focal lengths f which satisfy the following inequality: 0.002<1/f<0.1. The Abbe dispersion numbers of the lenses 20 and 21 are preferably less than 60, more preferably less than 40. On the whole, the collimator 1 of FIG. 4 comprises a lens 20 having negative refractive power and a low Abbe dispersion number, a lens 21 having positive refractive power and also a low Abbe dispersion number, as well as a mirror 23 having positive refractive power. By adjusting the distances D1-D3, the desired longitudinal chromatic aberration characteristic may be set and changed, while the focal length of the total system remains constant.

In particular, the collimator 1 of FIG. 4 may also comprise adjusting elements for the lenses 20 and 21 and for the mirror 23, so that the change in the longitudinal chromatic aberration characteristic can be automatically effected.

Figure 6:
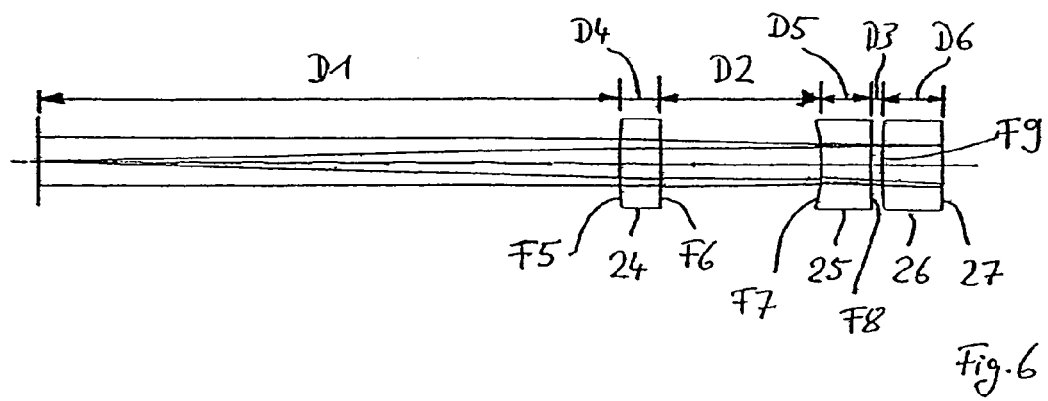
FIG. 6 shows a collimator according to a further embodiment.

FIG. 6 shows a collimator 1 which comprises a lens 24 having positive refractive power, a lens 25 having negative refractive power, and a mirror lens 26 having positive refractive power. The lenses each have a low Abbe dispersion number of, for example, less than 60, preferably less than 40. In the specific embodiment described herein, the Abbe dispersion number is 36.16. The collimator in FIG. 6 is also designed in a manner allowing the longitudinal chromatic aberration to be continuously tuned from over-corrected to under-corrected for a constant focal length of the total system. The distance from the entrance pupil to the surface F5 of the lens 25 is D1, the distance between the surfaces F6 and F7 of the lenses 24 and 25 facing each other is D2, and the distances between the surfaces F8 and F9 of the lenses 25 and 26 is D3. The lenses 24, 25 and 26 respectively have thicknesses D4, D5 and D6.

The collimator of FIG. 6 is designed such that the following conditions are satisfied:

$$|1/R6+0.3143/f+0.0088|<0.001$$

$$|f1-0.1175*f-45.775|<0.1*f$$

$$|f2+0.0133*f+14.621|<0.1*f$$

$$|f3-0.0286*f-9.6999|<0.1*f$$

$$|D2(\Delta s(=0))-D2(\Delta s(<0))-0.0004*f^2+0.2172*f-1.6243|<0.01*f$$

$$|D2(\Delta s(>0))-D2(\Delta s(<0))-0.0011*f^2+0.4239*f-2.7441|<0.01*f$$

In this embodiment, too, $\Delta s(<0)$ reaches a value a02 of about −3.5 and $\Delta s(>0)$ reaches a value a02 of about 3.5. The exact curvatures of the lens surfaces are as follows:
Radius of curvature of the convex surface F5: 71.76 mm,
Radius of curvature of the concave surface F6: 51.07 mm,
Radius of curvature of the concave surface F7: 8.90 mm,
Radius of curvature of the concave surface F8: 254.88 mm,
Radius of curvature of the convex surface F9: 49.08 mm,
Radius of curvature of the convex surface F10: 40.94 mm, D4=2.00
D5=5.52 and
D6=4.00.

|    | Δs(<0) | Δs(=0) | Δs(>0) |
|----|--------|--------|--------|
| D1 | 4.50   | 8.91   | 12.95  |
| D2 | 5.51   | 3.10   | 0.61   |
| D3 | 2.22   | 1.51   | 0.88   |

Figure 7:
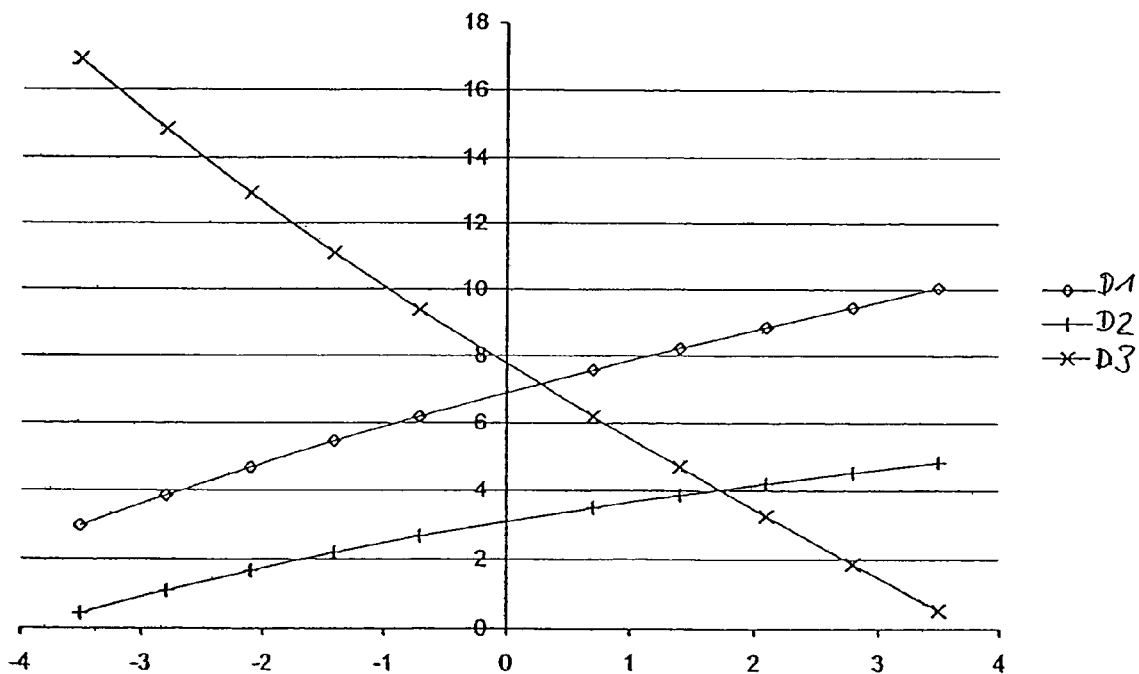
FIG. 7 shows a diagram from which the adjustable lens positions of the collimator of FIG. 6 as a function of the desired chromatic longitudinal aberration characteristic are evident.

The dependence of the longitudinal chromatic aberration characteristic on the individual distances D1-D3 is shown in the graphical representation of FIG. 7, said representation corresponding to that of FIG. 5. The representation of FIG. 7 allows the distances D1-D3 to be determined for a desired longitudinal chromatic aberration a02.

It is particularly advantageous in the described embodiments that all curved lens or mirror surfaces, respectively, can be provided as spherical surfaces.

The conditions indicated for the embodiments of FIGS. 4 and 6 can be derived by a person skilled in the art from numerical analysis of calculations of the optical properties of the respective collimators.

The light path in the above collimators is reversible such that a diverging beam emitted from the focal plane (in this case, the through hole 11 in the deflecting mirror 10, for example) is transformed into a parallel beam by the collimator, and a parallel beam is converted into a converging beam which is focused into the focal plane.

Figure 8:
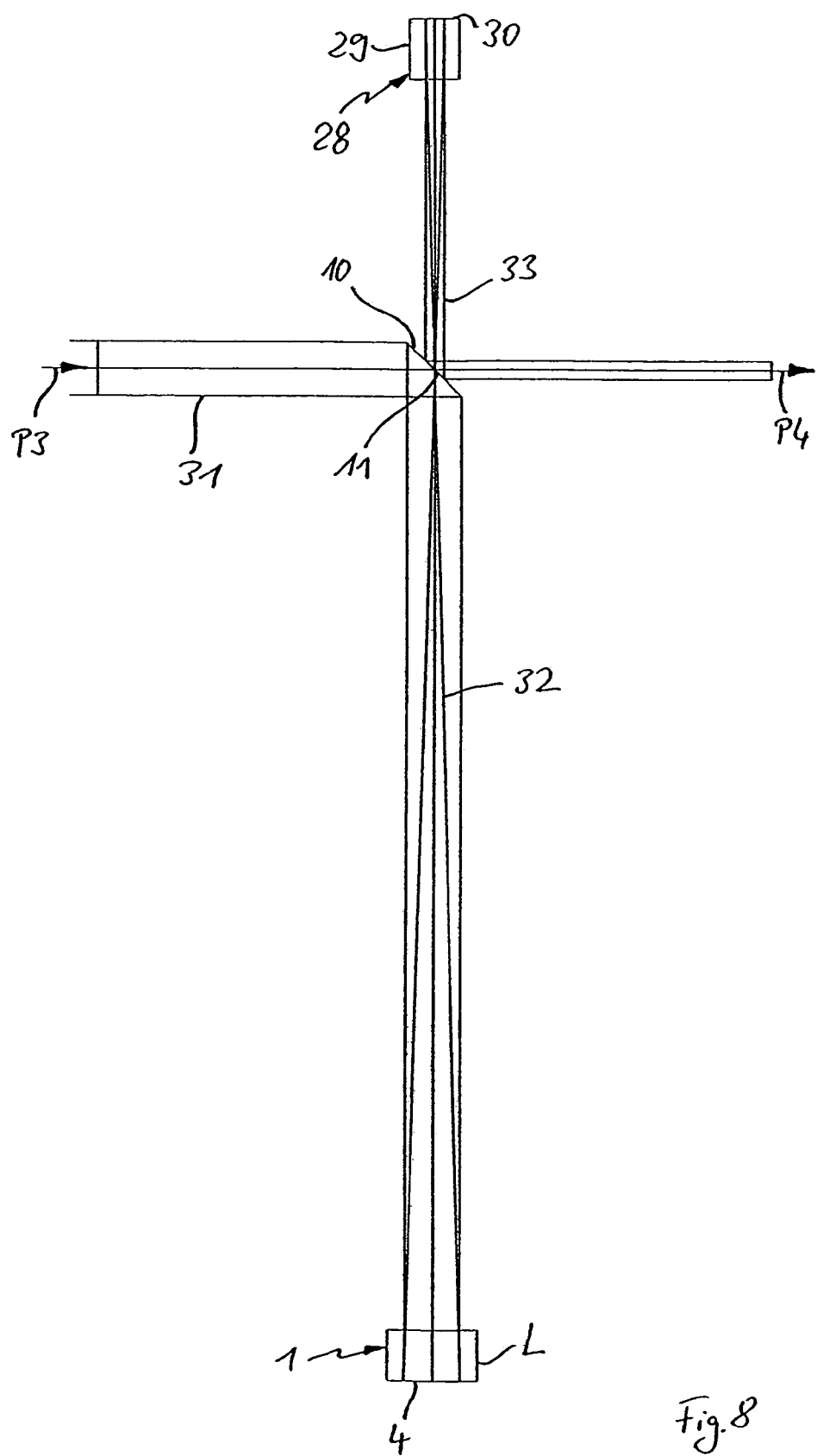
FIG. 8 shows a further embodiment of the optical system according to the invention.

FIG. 8 shows an alternative embodiment of the optical system according to the invention, wherein two collimators 1 and 28 are coupled in series via a deflecting mirror 10 such that they act as a device for expanding or reducing the beam cross-section of a parallel beam. For this purpose, the first collimator 1 is provided, for example, in the same manner as in the embodiment of FIG. 1, and the mirror 10 is again provided with a through hole 11, both sides of the mirror 10 being silvered in this case.

Arranged following the mirror 10 (i.e. above the mirror in the representation of FIG. 8), there is the second collimator 28 comprising a second lens 29 whose rear surface is silvered and is provided with a curved mirror surface 30. The distances of the two lenses L and 29 from the deflecting mirror as well as the dimensions of the lenses L, 29 are selected such that a parallel beam 31, which propagates along the direction of the arrow P3, is deflected downwards by the deflecting mirror 10, toward the lens L. After reflection of the beam 31 by the collimator 1, said beam is converted into a converging beam 32, which is focused onto the through hole 11 (i.e. the beam 32 has its smallest beam cross-section in the vicinity of the through hole 11).

After the mirror 10, the beam 32, having passed through the through hole 11, is then a diverging beam being reflected back in itself by the collimator 28 and thus being converted into a parallel beam 33, which impinges on the mirror 10 and is deflected by the latter to the right (in the direction of the arrow P4). In this case, the propagation directions P3 and P4 coincide in such a manner that the main rays of the beams 31 and 33 are located on a common axis. The beam 33 differs from the beam 31 in that its beam cross-section is smaller. Thus, the optical system of FIG. 8 acts as a device for reducing the beam cross-section and, of course, it is also possible to pass through the device in the opposite direction, in which case said device is then a beam expander.

The two collimators 1 and 28 may, of course, be improved or embodied as described in connection with FIGS. 1 to 7. In particular, the lenses L and 29 may be formed from the same material.

The invention claimed is:

1. A microscope, comprising:
   scanning optics;
   microscope optics including a tube lens and an objective to receive light from a microscope specimen;
   an optical unit; and
   a collimator, which collimator is arranged preceding or following the optical unit in a beam path of the microscope, said optical unit imposing a predetermined longitudinal chromatic aberration on a beam supplied to said beam path and said beam impinging on the collimator as a diverging beam or a parallel beam and being converted by said collimator into a parallel beam or a converging beam, with the collimator comprising at least one lens as well as a curved mirror which folds the beam path such that the supplied beam passes twice through the lens.

2. The microscope as claimed in claim 1, wherein the longitudinal chromatic aberration characteristic of the collimator is designed such that the longitudinal chromatic aberration imposed on the beam by the optical unit remains unchanged or is reduced.

3. The microscope as claimed in claim 2, wherein the mirror is provided as a rear-surface mirror on one side of the lens.

4. The microscope as claimed in claim 1, wherein the mirror is provided as a rear-surface mirror on one side of the lens.

5. The microscope as claimed in claim 3, wherein the collimator comprises the lens as the only lens and the mirror as the only mirror.

6. The microscope as claimed in claim 1, wherein both sides of the lens are provided as spherical surfaces.

7. The microscope as claimed in claim 1, wherein the beam impinges on the collimator such that the main ray of the beam coincides with the optical axis of the collimator.

8. The microscope as claimed in claim 7, wherein a deflecting mirror comprising a through hole is arranged preceding or following the collimator in the beam path, wherein said beam, if it is a diverging beam, passes through the through hole and impinges on the collimator, and the parallel beam coming from the collimator is deflected by the deflecting mirror, and wherein the beam, if it is a parallel beam, is deflected by the deflecting mirror to the collimator and impinges on the collimator, and the converging beam coming from the collimator passes through the through hole.

9. The microscope as claimed in claim 1, wherein the collimator is provided as a first exchangeable collimator, which may be replaced with a second collimator, said second collimator having a longitudinal chromatic aberration characteristic for a different wavelength region than the first collimator such that, for the other wavelength region, the longitudinal chromatic aberration imposed by the optical unit remains unchanged or is reduced.

10. The microscope as claimed in claim 1, wherein the collimator comprises the mirror as well as two or three lenses, and the lenses as well as the mirror are displaceable along the optical axis of the collimator so as to allow adjustment of a desired longitudinal chromatic aberration characteristic of the collimator.

11. The microscope as claimed in claim 10, wherein all lenses are produced from the same material.

12. The microscope as claimed in claim 1, wherein the optical unit itself is provided as a further collimator, comprising at least a second lens and a second curved mirror, the latter folding the beam path such that the supplied beam passes twice through the second lens.

13. The microscope as claimed in claim 1, wherein the microscope is a laser-scanning microscope and the collimator is used at least in one of an excitation beam path and a detection beam path of the microscope.

14. The microscope as claimed in claim 1, wherein the microscope is a fluorescence correlation spectroscope and the collimator is used in at least one of an excitation beam path and a detection beam path of the spectroscope.

15. A microscope comprising:
microscope optics including a tube lens and an objective to receive light from a microscope specimen;
an optical unit and a collimator, with the collimator arranged preceding the optical unit in a beam path of the microscope, said optical unit imposing a predetermined longitudinal chromatic aberration on a beam supplied to said beam path and said beam impinging on the collimator as a diverging beam or a parallel beam and being converted by said collimator into a parallel beam or a converging beam, with the collimator comprising at least one lens as well as a curved mirror which folds the beam path such that the supplied beam passes twice through the lens.

16. The microscope as claimed in claim 15, wherein the longitudinal chromatic aberration characteristic of the collimator is designed such that the longitudinal chromatic aberration imposed on the beam by the optical unit remains unchanged or is reduced.

17. The microscope as claimed in claim 15, wherein the optical unit itself is provided as a further collimator, comprising at least a second lens and a second curved mirror, the latter folding the beam path such that the supplied beam passes twice through the second lens.

18. The microscope as claimed in claim 15, wherein the microscope is a laser-scanning microscope and the collimator is used at least in one of an excitation beam path and a detection beam path of the microscope.

19. A microscope, comprising:
microscope optics including a tube lens and an objective to receive light from a microscope specimen;
an optical unit and a collimator, which collimator is arranged following the optical unit in a beam path of the microscope, said optical unit imposing a predetermined longitudinal chromatic aberration on a beam supplied to said beam path and said beam impinging on the collimator as a diverging beam or a parallel beam and being converted by said collimator into a parallel beam or a converging beam, with the collimator comprising at least one lens as well as a curved mirror which folds the beam path such that the supplied beam passes twice through the lens.

20. The microscope as claimed in claim 19, wherein the optical unit itself is provided as a further collimator, comprising at least a second lens and a second curved mirror, the latter folding the beam path such that the supplied beam passes twice through the second lens.

* * * * *